United States Patent [19]

Brenneke

[11] Patent Number: 4,930,756
[45] Date of Patent: Jun. 5, 1990

[54] BURN TABLE

[75] Inventor: William N. Brenneke, Oswego, Ill.

[73] Assignee: Caterpillar Inc., Peoria, Ill.

[21] Appl. No.: 394,915

[22] Filed: Aug. 17, 1989

[51] Int. Cl.[5] ............................................. B23K 7/00
[52] U.S. Cl. ........................................ 266/49; 266/65
[58] Field of Search ........................... 266/48, 49, 65; 148/9 R

[56] References Cited

U.S. PATENT DOCUMENTS

| | | | |
|---|---|---|---|
| 3,301,543 | 1/1967 | Semper | 266/49 |
| 3,701,514 | 10/1972 | Walters et al. | 266/48 |
| 3,743,260 | 7/1973 | Alleman et al. | 266/49 |
| 3,770,110 | 11/1973 | Boskovitch | 198/220 |
| 3,792,846 | 2/1974 | Geffert | 266/49 |
| 3,851,864 | 12/1974 | Miller | 266/49 |
| 3,941,361 | 3/1976 | Cranston et al. | 269/15 |
| 3,969,132 | 7/1976 | Anderson et al. | 134/18 |
| 4,121,808 | 10/1978 | Cardea | 266/58 |
| 4,162,060 | 7/1979 | Anderson et al. | 266/49 |
| 4,176,828 | 12/1979 | Lange | 266/65 |
| 4,341,374 | 7/1982 | Seelinger | 266/49 |
| 4,524,955 | 6/1985 | Boardman | 266/49 |

FOREIGN PATENT DOCUMENTS 0259953 9/1988 Fed. Rep. of Germany ........ 266/49

Primary Examiner—S. Kastler
Attorney, Agent, or Firm—Robert E. Muir; Sterling R. Booth, Jr.

[57] ABSTRACT

A burn table suitable for supporting a workpiece during cutting is disclosed. The burn table comprises a fluid tank for providing a preselected fluid level and a bed of granular material, an upper surface of which supports a workpiece at a preselected distance from the level of the fluid. The granular material is diamagnetic and generally noncombustible. A chamber is in fluid communication with the fluid residing in the tank along with means for introducing into and exhausting from the chamber a gas. Raising or lowering the fluid level in the tank occurs by, respectively, introducing into or exhausting gas from the chamber. A guide rail attached to the tank and a smoothing bar are provided to screed or level the surface of the bed of granular material which supports the workpiece. In addition, the smoothing bar includes an electromagnet permitting slag formed during the cutting process to be removed during leveling of the granular material bed surface.

13 Claims, 2 Drawing Sheets

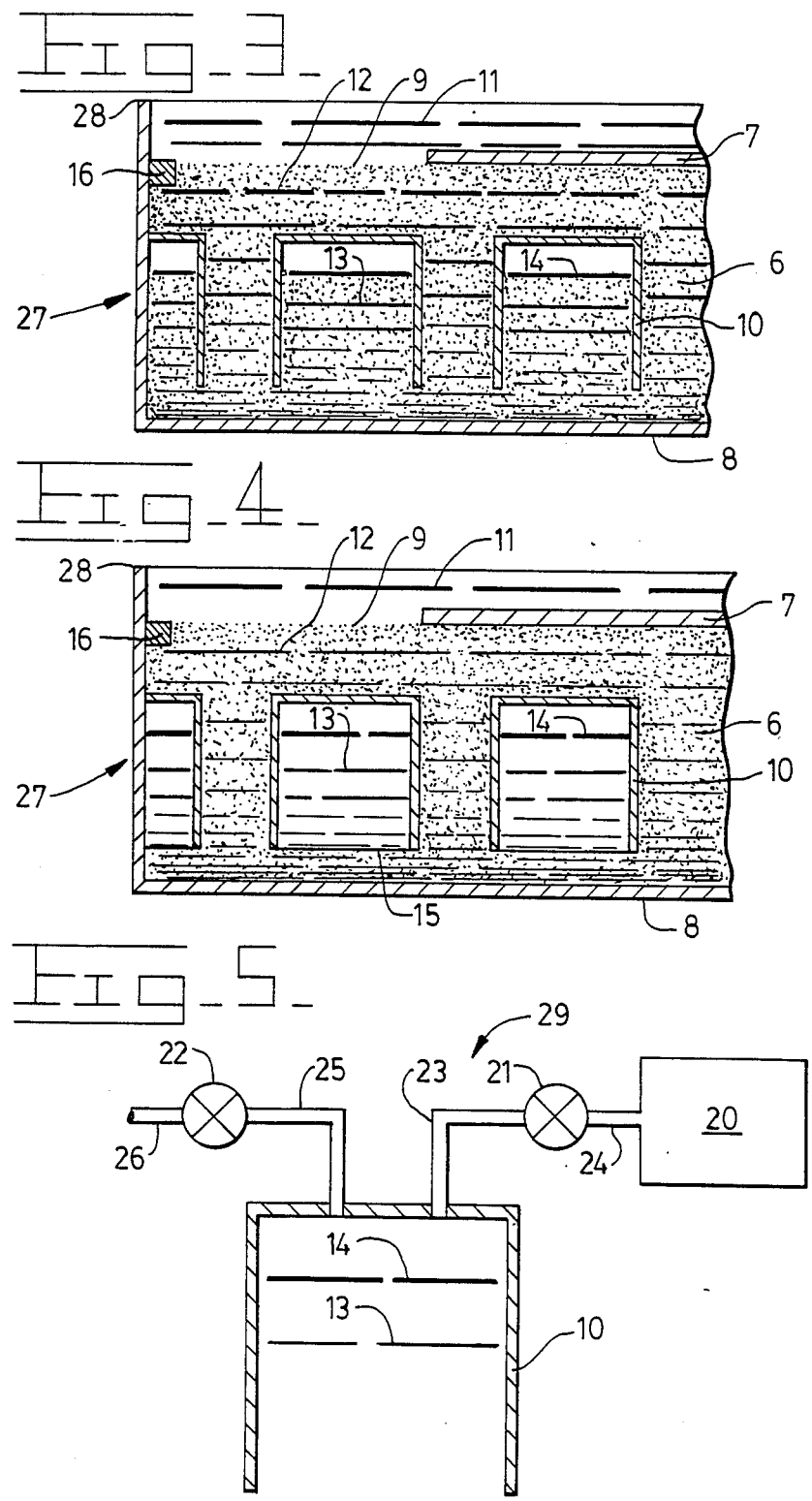

BURN TABLE

TECHNICAL FIELD

This invention relates generally to metal working and more particularly to a burn table having an improved workpiece support which accommodates an improved slag removal structure

BACKGROUND ART

Production flame cutting machines, including oxyfuel or plasma systems, need means to support the plate stock being cut. To limit fumes and to cool the plate during the cutting operation, the plate is often supported at or just beneath the surface of a pool of water. Such water table systems facilitate operator access to the plate by lowering the water level while the operator loads or unloads the table.

An early use for the water table was for oxy-fuel cutting (e.g., oxygen-acetylene cutting) steel plate. The steel plate was supported in the water table by placing bars beneath the plate. See for example U.S. Pat. No. 4,121,808 issued Oct. 24, 1978 to Jerry F. Cardea. To minimize damage to the bars from the heat of the cutting torch, the support bars were constructed from material having high thermal conductivity, such as copper or aluminum. More recently, electric plasma torches forced a change to less expensive steel support bars because the much higher temperatures which plasma torches generate can easily melt aluminum, copper, or steel supports.

Although steel bars reduce support replacement cost, they have other inherent problems. When the cutting path crosses the steel support bars, the plasma torch cuts the bars as it cuts through the steel plate. In addition, the plasma cut generates molten metal slag which accumulates on the support bars eventually making the support surface uneven. An operator must frequently remove this slag to maintain cut quality. Eventually, the bars become unusable and must be replaced. The operator must also separate plate sections from support bars which slag welds together during the cutting process. Further, cut quality can be adversely affected when the plasma torch cuts along a substantial path directly above a support bar. Parts shorter than twice the distance between adjacent support bars may tip after being cut and can damage the cutting torch if they collide as the torch cuts adjacent parts. Steel support bars can adversely affect cut quality, can damage equipment, and require frequent operator intervention to remove slag which accumulates on the bars, to separate parts which become welded to the support bars, and to replace unusable support bars.

To avoid some of the problems inherent with steel support bars, discrete supports have been placed beneath the steel plate for support. Examples of these discrete supports include a plurality of metal cups, cones, or short lengths of tube. See for example U.S. Pat. No. 4,524,955 issued Jun. 25, 1985 to Peter W. Boardman. Copper, aluminum, or steel supports of this type are easily melted by plasma torches. In addition, steel discrete supports share many of the problems inherent with steel bars; an operator must intervene to remove slag which accumulates on the supports, to separate parts which become welded to the supports, and to replace damaged supports.

An inherent problem associated with these discrete supports is the need to accurately place them beneath the workpiece. The operator must position the discrete supports so they can avoid the torch cut path while continuously supporting the workpiece and the scrap plate which the torch cuts away. Further, the discrete support positions must change when the burn table is to be used to cut a different part from plate stock.

The present invention is directed to overcoming one or more of the problems set forth above.

DISCLOSURE OF THE INVENTION

In accordance with one aspect of the present invention, a burn table adapted for supporting a workpiece beneath a cutting machine such as plasma, oxy-fuel and laser cutting machines is provided. The burn table comprises a tank having an open top and containing a liquid and a bed of granular, diamagnetic, noncombustible material having a substantially horizontal upper surface adjacent the top of the tank for supporting the workpiece. A liquid level is normally maintained between the top of the tank and the upper surface of the bed of granular material during operation of the cutting machine. Another feature of the burn table is that it is selectively actuatable to raise and lower the level of the liquid. The burn table includes a chamber in fluid communication with the fluid residing in the tank. Introducing and exhausting a gas into and from the chamber respectively increases and reduces the level of the fluid in the tank. Another feature of the burn table is a magnetic smoothing bar for leveling the bed of granular material and for removing magnetic slag therefrom A guide rail attached to the tank adjacent the surface of the bed of granular material is used to guide a magnetic smoothing bar along which removes slag as it levels the surface of the bed of granular material.

BRIEF DESCRIPTION OF THE DRAWINGS

FIG. 3 is a longitudinal section view of the burn table shown in FIG. 1;

FIG. 4 is a view similar to FIG. 3 but illustrating use of a sand screen in conjunction with an air chamber; and FIG. 5 is a diagrammatic section view of the air chamber and associated pneumatic circuitry for changing the level of the water in the burn table.

BEST MODE FOR CARRYING OUT THE INVENTION

Figure 1:
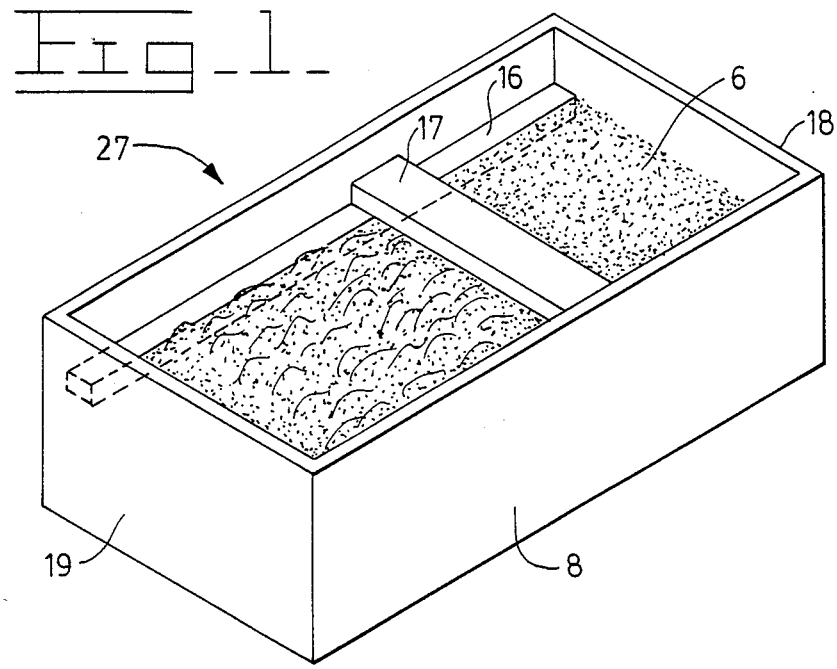
FIG. 1 is an isometric view of a burn table embodying the present invention.

A burn table 27, as illustrated in FIGS. 1-4, suitable for at least partially supporting a workpiece 7 during cutting comprises a water tank 8 for providing a preselected water level and a bed of granular material 6 having a substantially horizontal upper surface 9 upon which to support the workpiece 7. The burn table 27 includes a chamber 10 in fluid communication with the water in the tank 8. Means, generally referred to by reference numeral 29 in FIG. 5, is provided for introducing air into and evacuating air from the chamber 10. Introduction of air into the chamber 10 increases the water level in the tank 27 to a level 11 desirable during the cutting process. Evacuation of air from the chamber 10 decreases the water in the tank 27 to a level 12 which is desirable during material handling. FIGS. 3 and 4 illustrate the material handling water level 12 being beneath the surface 9 of the granular bed 6; however, the level of the water needs only to drop sufficiently to load upon or unload a workpiece 7 from the burn table 27.

The bed of material 6 is composed of a noncombustible, diamagnetic, granular material. The present embodiment advantageously uses mason sand as the granular material. Alternative materials include silica sand, fine pea gravel, cinders, and others. The material should be diamagnetic and noncombustible. In addition, the density of the material combined with its grain size should permit the cutting torch to blow the grains out of the cutting path to create a shallow trench in the bed of granular material 6 under the workpiece 7 into which slag is deposited (Slag generated by cutting steel is attracted to a magnet). Heavier materials may remain near the cut path to adversely affect cut quality or to glasify thus forming a diamagnetic slag which must be removed mechanically from the material bed 6.

In the present embodiment, the chamber 10 resides in the tank 8 and is an inverted rectangular canister. Referring to FIG. 5, a pressurized air source 20 is connected near the top of the chamber 10. A stop cock 21 may be opened to permit air to enter the chamber 10. A valve 22 may be opened to permit the air contained within the chamber 10 to escape into the atmosphere. Conduit 24 connects the air source 20 to the stop cock 21 and an additional conduit 23 connects the stop cock 21 to the chamber 10. Conduit 25 also connects the chamber to the valve 22 which may pass gas from the chamber 10 to the atmosphere via conduit 26. Introduction of air into the chamber 10 results in a water level 13 inside the chamber 10 corresponding to the tank 27 cutting water level 11. Evacuation of air from the chamber 10 produces a water level 14 within the chamber 10 corresponding to the tank 27 material handling water level 12.

Washing of granular material into the chamber 10 may or may not be a problem for a particular cutting application. If the production rate for a burn table 27 is low, granular material washing into the chamber 10 is usually not a problem. Granular material in the chamber 10 will adversely affect the rate at which the water level may be changed from level 11 to level 12 or vice versa. If the production rate for a table is high, the chamber 10 preferably has a sand screen 15 covering its opening (see FIG. 2). The sand screen 15 permits passage of water and air but prohibits passage of granular material.

The present embodiment also facilitates removal of the magnetic slag which forms during the cutting process. A guide member 16 is provided to guide a smoothing member 17 along a surface 9 of the bed 6 of granular material. The smoothing member 17 aids in the process of leveling the surface 9 of the bed of granular material 6. The action of raising and lowering the water level combined with motion of the smoothing member 17 levels the bed of granular material 6. In the present embodiment, the smoothing bar 17 is magnetized by an electromagnet (not shown) of any well-known construction. In this way, the smoothing bar 17 collects the magnetic slag during the smoothing process.

Figure 2:
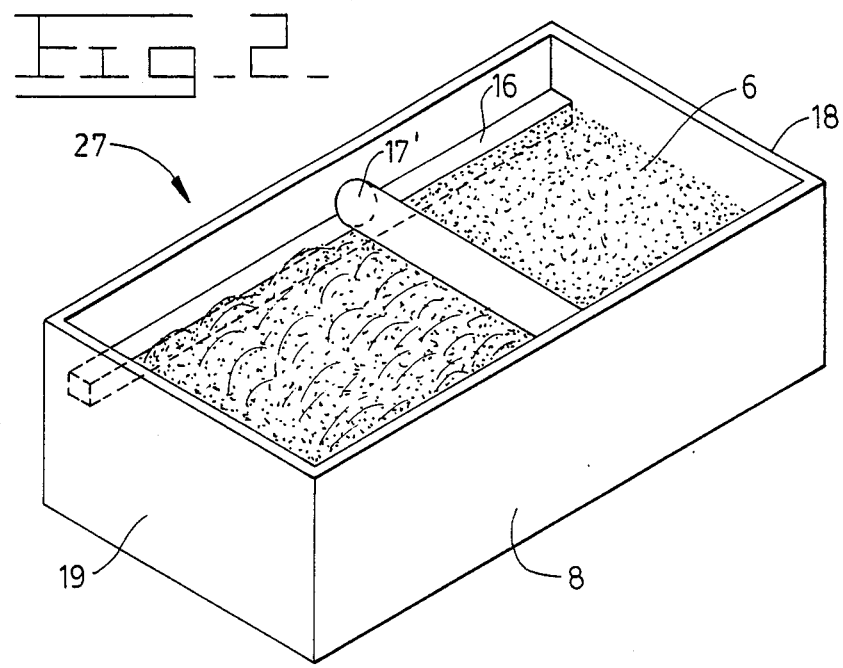
FIG. 2 is an isometric view of another embodiment of a burn table illustrating a cylindrical smoothing bar.

The smoothing bar 17 must have a profile which tends to flatten the bed of granular material 6 as the smoothing bar 17 moves from one end 18 to a second end 19 of the burn table 27. The smoothing bar 17 may be rectangular as shown in FIG. 1 and dragged across the surface 9 of the bed of granular material 6. Alternatively, the smoothing bar 17 may be cylindrical as shown in FIG. 2 and rolled across the surface 9 of the bed of granular material 8. The cylindrical embodiment is most advantageous when the molten slag formation is significant because this embodiment does not drag the slag pieces across the surface 9 as does the rectangular embodiment shown in FIG. 1.

It should be noted that many workpieces 7 could be cut before the slag would need to be removed. Slag removal frequency depends upon the quantity of slag generated.

The surface 9 of the bed of granular material 6 has a flatness tolerance which depends upon the torch performing the cutting. The surface 9 is maintained within the required tolerance by either manually or mechanically screeding with the smoothing bar 17 described above. Mechanical screeding methods include attaching a vibration source to the smoothing bar 17. In addition, the bed of granular material 6 is fluidized by pumping water through it from bottom to top. The fluidized bed of granular material 6 seeks a level surface 9 as water does and pumping water through the bed 6 accelerates this process. The degree of mechanization depends upon the burn table 27 production rate.

INDUSTRIAL APPLICABILITY

The burn table eliminates the need to replace expensive workpiece support structure which plasma torches, as described in the background art section, damage directly while cutting a workpiece and indirectly by depositing slag thereon. A bed of inexpensive, granular material supporting the workpiece resists damage from a cutting torch thus dramatically reducing material cost. The present embodiments reduce labor cost since an operator no longer changes or maintains the workpiece support structure in the manner described in the background section. In addition, the burn table avoids adverse effects to cut quality which occur when a plasma torch cuts along a substantial path directly above a prior art support member because the granular material supporting the workpiece in the present invention is blown away from the cutting area by the torch. Further, since a granular bed of material supports a workpiece and waste material cut therefrom, the likelihood of parts tipping up after being cut and damaging the cutting torch is greatly diminished over prior support methods.

Removal of slag is an easier, less expensive task for the present invention than for many prior methods. Since the slag formed during the cutting process is attracted to a magnet and the granular material supporting the workpiece is diamagnetic, the

I claim:

1. A burn table adapted for supporting a workpiece beneath a cutting machine, comprising:
   a tank having an open top and containing a liquid;
   a bed of granular material in the tank, the bed having a substantially horizontal upper surface adjacent the top of the tank for supporting the workpiece; and
   liquid level control means associated with the tank for normally maintaining a liquid level between the top of said tank and the upper surface of said bed of granular material during operation of said cutting machine.

2. A burn table as set forth in claim 1 wherein said granular material is diamagnetic and generally noncombustible.

3. A burn table as set forth in claim 2 wherein said diamagnetic, noncombustible, granular material is silica sand.

4. A burn table as set forth in claim 2 wherein said diamagnetic, noncombustible, granular material is mason sand.

5. A burn table as set forth in claim 1 wherein said liquid includes water.

6. A burn table as set forth in claim 1 wherein said liquid level control means is selectively actuatable to raise and lower said level of the liquid.

7. A burn table as set forth in claim 6 wherein said liquid level control means includes:
   a chamber in fluid communication with the fluid residing in the tank; and
   means for introducing into and exhausting from the chamber a gas, said introducing and exhausting of the gas respectively reducing and increasing a quantity of fluid held within the chamber,
   whereby said reducing and increasing the quantity of fluid held within the chamber respectively reduces and increases said level of the fluid in the tank.

8. A burn table as set forth in claim 7 wherein said chamber resides inside said tank.

9. A burn table as set forth in claim 7 wherein said gas includes air.

10. A burn table as set forth in claim 7 wherein said means for introducing gas into into said chamber includes:
   a source of high pressure gas;
   a stop cock having a first side and a second side;
   conduit connecting the gas source to the first side of the stop cock; and
   conduit connecting the second side of the stop cock to said chamber.

11. A burn table as set forth in claim 7 wherein said means for exhausting gas from said chamber includes:
   a valve having a first side and a second side;
   conduit connecting the first side of the valve to the chamber; and
   means permitting gas to flow from the second side of the valve to the atmosphere.

12. A burn table as set forth in claim 1 wherein said burn table includes means for leveling said bed and for removing magnetic slag from the bed of granular material, said leveling and slag removing means comprising:
   a guide rail attached to the tank adjacent said surface of the bed of granular material;
   a magnetic smoothing bar which moveably rests upon the guide rail; and
   means for moving the smoothing bar along said guide rail.

13. A burn table as set forth in claim 12 wherein said magnetic smoothing bar includes an electromagnet.

* * * * *